United States Patent [19]
Yoshida et al.

[11] Patent Number: 5,972,830
[45] Date of Patent: Oct. 26, 1999

[54] HIGH HEAT-RESISTANT CATALYST WITH A POROUS CERIA SUPPORT

[75] Inventors: Takeru Yoshida, Susono; Mikio Murachi, Toyota; Shinji Tsuji, Susono; Norio Taguchi, Chiryu, all of Japan

[73] Assignee: Toyota Jidosha Kabushiki Kaisha, Toyota, Japan

[21] Appl. No.: 08/570,611

[22] Filed: Dec. 11, 1995

[30] Foreign Application Priority Data

Dec. 19, 1994 [JP] Japan ..................................... 6-315341
May 25, 1995 [JP] Japan ..................................... 7-126895

[51] Int. Cl.$^6$ ..................................... B01J 23/10
[52] U.S. Cl. ..................... 502/304; 502/302; 502/344; 502/355; 502/349; 502/325; 502/326; 502/327; 502/332; 502/340; 502/341
[58] Field of Search ..................... 502/344, 355, 502/304, 302, 349, 325, 326, 327, 332, 340, 341

[56] References Cited

U.S. PATENT DOCUMENTS 3,686,340  8/1972  Patrick et al. ................ 260/672 R
5,075,276  12/1991  Ozawa et al. .................... 502/304

FOREIGN PATENT DOCUMENTS

| 0 181 802 | 5/1986 | European Pat. Off. . |
| 0485180 | 11/1991 | European Pat. Off. . |
| 0 507 590 | 10/1992 | European Pat. Off. . |
| 0613714 | 1/1994 | European Pat. Off. . |
| 0657204 | 12/1994 | European Pat. Off. . |
| 0718028 | 12/1995 | European Pat. Off. . |
| 36 40 025 | 5/1987 | Germany . |
| 3913972 | 4/1989 | Germany . |
| 42 06 310 | 9/1993 | Germany . |
| 5-168860 | 7/1993 | Japan . |
| 5-317652 | 12/1993 | Japan . |
| 6-31139 | 2/1994 | Japan . |
| 2 248 194 | 4/1992 | United Kingdom . |

OTHER PUBLICATIONS

Chemical Abstracts (80:136990 CA), Matsushita, Kuniichi, "Alumina catalysts containing sodium potassium, and cesium oxides for decomposing nitrogen", Jan. 22, 1974.
Database WPI, Section Ch, Week 9520, Derwent Publications Ltd., London, GB; Class E36, AN 95–151542— JP–A–07 075 735 (Toyota Jidosha KK), Mar. 20, 1995.
Database WPI, Section Ch, Week 9305, Derwent Publications Ltd., London, GB; Class E19, AN 93–039292— JP–A–04 363 138 (Toyota Cent Res & Dev Lab), Dec. 16, 1992.
Derwent Abstracts Accession No. 86–254801/39, JP,A, 61–181538 (Matsushita Elec. Ind. kk) published Aug. 14, 1985.
Derwent Abstracts Accession No. 88–165593/24, JP,A, 63–104651 (Nissan Motor kk), published Oct. 23, 1986.
Derwent Abstracts Accession No. 92–402137/49, JP,A, 4–298253 (Agency of Ind, Sci. & Technology), published Oct. 22, 1992.
Derwent Abstracts Accession No. 92–060010/08, JP,A, 4–004043 (Nissan Motor kk), published Jan. 8, 1992.
Derrwent Abstracts Accession No. 90–190622/25, JP,A, 2–126939 (Babcock–hitachi kk), published May 15, 1990.

*Primary Examiner*—Walter D. Griffin
*Assistant Examiner*—Nadine Preisch
*Attorney, Agent, or Firm*—Oliff & Berridge, PLC

[57] ABSTRACT

This catalyst support aims to improve heat resistant and durability by highly dispersing an $NO_x$ storage component. This catalyst support is produced by mixing a solution of a chemical compound including at least one element of alkali metals, alkaline-earth metals, and rare-earth elements with a solution of oxide sol of at least one metal of group IIIb, group IVa, and group IVb in the periodic table to prepare a mixed sol solution, forming the mixed sol solution into gel, and drying and calcining the gel. The obtained catalyst support is amorphous and attains a high specific surface area even when calcined at elevated temperatures, so that the catalyst support is superior in heat resistance.

1 Claim, No Drawings

HIGH HEAT-RESISTANT CATALYST WITH A POROUS CERIA SUPPORT

BACKGROUND OF THE INVENTION

1. Field of the Invention

This invention relates to a high heat-resistant catalyst support used for a catalyst for purifying automotive exhaust gases and the like, a method of producing the catalyst support at a low cost, a high heat-resistant catalyst using the catalyst support, and its production method.

2. Description of Related Art

As catalysts for purifying automotive exhaust gases, there have been employed 3-way catalysts so far which oxidize carbon monoxide (CO) and hydrocarbons (HC) and reduce nitrogen oxides ($NO_x$) to purify the exhaust gases. For example, the 3-way catalysts have been known widely which comprise a heat-resistant supporting base material formed of cordierite, a porous catalyst support layer formed of gamma-alumina and disposed on the supporting base material, and a noble metal catalyst ingredient such as platinum (Pt) and rhodium (Rh) loaded on the porous catalyst support layer. Further, the 3-way catalysts are also known in which ceria i.e., cerium oxide having an oxygen storage ability is employed in addition to the above catalyst ingredient in order to improve catalytic activity at low temperatures.

In the meanwhile, carbon dioxide ($CO_2$) in exhaust gases from internal combustion engines of automobiles and the like has become a problem in view of global environmental conservation. Lean burn in oxygen excessive atmospheres is desired as a means of dissolving the problem. The lean burn improves fuel consumption, and as a result the amount of fuel used is decreased and $CO_2$, which is included in combustion exhaust gas, can be suppressed from generating.

In this respect, the conventional 3-way catalysts aim to oxidize CO and HC and reduce $NO_x$ simultaneously into innocuous entities when the air-fuel ratio is at the stoichiometric point (or the ideal air-fuel ratio), and cannot exhibit sufficient reduction and removal of $NO_x$ in the exhaust gases which contain oxygen in excessive amounts required for oxidizing carbon monoxide and hydrocarbons therein at the time of lean burn. Hence, it has been desired to develop catalysts and exhaust gas purifying systems which are capable of adequately purifying $NO_x$ even in oxygen excessive atmospheres.

In view of the aforementioned circumstances, the applicants et al of the present invention have proposed an exhaust gas purifying catalyst in which alkaline-earth metals and platinum (Pt) are loaded on a porous support formed of alumina and the like in Japanese Unexamined Patent Publication (KOKAI) No.5-317,652, an exhaust gas purifying catalyst in which lanthanum (La) and platinum (Pt) are loaded on a porous support in Japanese Unexamined Patent Publication (KOKAI) No.5-168,860, and an exhaust gas purifying catalyst in which alkali metals and platinum (Pt) are loaded on an alumina support in Japanese Unexamined Patent Publication (KOKAI) No.6-31,139. In using these catalysts, $NO_x$ are adsorbed on oxides of alkaline-earth metals or lanthanum oxide on the fuel-lean side (i.e., in the oxygen excessive atmospheres), and the adsorbed $NO_x$ react with reducing components such as HC and CO at the stoichiometric point or on the fuel-rich side (i.e., in the oxygen-lean atmospheres). So, these catalysts attain excellent $NO_x$ purifying performance even on the fuel-lean side.

The production of these catalysts is mainly achieved by what we call a loading-by-water absorption method. For example, first, a porous support formed of alumina or the like is impregnated with a solution containing a chemical compound of a noble metal catalyst ingredient, dried, and calcined, thereby loading the noble metal catalyst ingredient thereon. Second, the noble metal-loaded support is reimpregnated with a solution containing a chemical compound of an $NO_x$ storage component, dried, and calcined, thereby loading the $NO_x$ storage component thereon.

By the way, the average temperature and the maximum temperature of inlet gases to the bed of catalysts tend to rise more and more in recent years due to severe restrictions on exhaust gases and the improvement in the capacity of engines. Therefore, it is desired to make a further improvement in the heat resistance of catalysts for purifying exhaust gases. Further, with an increase in inlet gas temperatures, it is also desired to improve $NO_x$ conversion at elevated temperatures.

In the conventional catalysts, however, there arises a problem that $NO_x$ storage components react with catalyst supports at high temperatures and as a result the $NO_x$ storage ability of the $NO_x$ storage components is deteriorated. Besides, in the conventional catalysts, a temperature range in which the maximum catalyst performance is obtained, namely, a temperature window is narrow, and the $NO_x$ conversion is hardly secured at elevated temperatures.

Further, in the conventional catalysts, the $NO_x$ storage components are poisoned by $SO_x$ which are produced from a very small amount of sulfur contained in fuel, in other words, the $NO_x$ storage ability is decreased due to sulfate generation. Consequently, the catalysts are degraded in durability.

Further, in the conventional methods of producing catalysts, the $NO_x$ storage components are loaded by a loading-by-water absorption method. When this method is employed, the $NO_x$ storage components have a poor dispersion, i.e., a maldistribution. As a result, crystallization of the $NO_x$ storage components is promoted at and around a part having a high loading concentration of the $NO_x$ storage components, so that the $NO_x$ storage ability is deteriorated. The $NO_x$ storage ability, especially at elevated temperatures is greatly influenced by the combination of $NO_x$ storage components and catalyst supports, and the dispersibility of $NO_x$ storage components.

Further, when the $NO_x$ storage components are poorly dispersed, sulfate crystals generated by sulfur poisoning easily grow and therefore, become more difficult to be removed, so that the durability of the catalysts is decreased. In addition, in the case where the $NO_x$ storage component is an alkali metal, the $NO_x$ storage component tends to be flown away or eluted by water vapor contained in exhaust gases, because the $NO_x$ storage component is loaded on the surface of the catalyst support in the conventional methods. Hence, the catalyst is poor in durability.

SUMMARY OF THE INVENTION

The present invention has been developed in view of the aforementioned circumstances. It is therefore an object of the present invention to improve heat resistance and durability of a catalyst by highly dispersing an $NO_x$ storage component.

A high heat-resistant catalyst support according to the present invention, which dissolves the above problems, comprises:

an oxide of at least one metal selected from the group consisting of elements of group IIIb, group IVa, and group IVb in the periodic table, and an $NO_x$ storage component comprising an oxide of at least one element selected from the group consisting of alkali metals, alkaline-earth metals, and rare-earth elements, the oxide and the $NO_x$ storage component constituting an amorphous composite oxide.

In the high heat-resistant catalyst support of the present invention, the $NO_x$ storage component constitutes an amorphous composite oxide together with an oxide of a metal such as aluminum, and highly dispersed. Therefore, the $NO_x$ storage component is suppressed from reacting with a catalyst support, and heat resistance is secured. Further, even when sulfur poisoning is caused, sulfates are suppressed from growing owing to the high dispersion of the $NO_x$ storage component. Since $SO_x$ can be easily removed, the durability of the $NO_x$ storage ability is superior.

In the high heat-resistant catalyst support of the present invention, it is preferable that the oxide is alumina, that the $NO_x$ storage component is cesium oxide, that the cesium oxide and the aluminum oxide have a molar ratio satisfying the following formula:

$$1/3 > Cs_2O/Al_2O_3 > 1/90,$$

and that the amorphous composite oxide is an amorphous composition which has been subjected to a thermal treatment at a temperature at which the composition is not crystallized.

In this preferable catalyst support, alumina is employed as the oxide, and cesium (Cs) is employed as an element constituting the $NO_x$ storage component. Therefore, in addition to the fact that the same functions as that of the above basic catalyst support are exhibited, cesium is not only superior in $NO_x$ storage ability at low temperatures, but also superior in $NO_x$ storage ability at temperatures of 400° C. or more because of interaction with aluminum.

This cesium is a strong base and firmly bonded with acidic $NO_x$, so the $NO_x$ storage ability is excellent. Besides, since cesium more hardly reacts with alumina than barium and the like, the $NO_x$ storage ability can be maintained high for a long time. Further, because cesium forms a composite oxide together with alumina in this catalyst support, a high durability is obtained. Even when sulfur poisoning is caused, sulfate is generated in the form of a composite sulfate of cesium and aluminum, and accordingly the sulfate is easily decomposable and removable than the sulfate of barium and the like.

The compositional molar ratio of cesium to aluminum preferably satisfies the following formula:

$$1/3 > Cs_2O/Al_2O_3 > 1/90.$$

When a larger amount of cesium is contained, i.e., the ratio of $Cs_2O$ to $Al_2O_3$ is equal to or more than 1/3, although the catalyst support has an $NO_x$ adsorbing ability, the release of $NO_x$ in the reducing atmospheres is insufficient, the specific surface area is small, and heat resistance is deteriorated. On the other hand, when a smaller amount of cesium is contained, i.e., the ratio of $Cs_2O$ to $Al_2O_3$ is equal to or less than 1/90, the catalyst support is sintered at elevated temperatures, with the result that the specific surface area is lowered and necessary $NO_x$ storage ability is hardly maintained. Therefore, the compositional ratio in this range achieves sufficient heat resistance and durability.

In this preferred high heat-resistant catalyst support, a part of the cesium may be replaced with at least one element selected from the group consisting of alkali metals except cesium, alkaline-earth metals, rare-earth elements, and transition elements.

The replacing elements are superior in sulfur poison resistance to cesium. Therefore, both excellent $NO_x$ purifying ability and sulfur poison resistance can be attained. For example, since titanium is an acidic element, sulfates are prevented from generating. Potassium or calcium forms a composite sulfate of three-element components together with cesium and aluminum. This sulfate can be decomposed at lower temperatures than composite sulfates of two-element components, so the decomposing temperature is lowered.

A method of producing a high heat-resistant catalyst support according to the present invention, comprises the steps of:

mixing a solution of a chemical compound including at least one element selected from the group consisting of alkali metals, alkaline-earth metals, and rare-earth elements with a solution of oxide sol of at least one metal selected from the group consisting of elements of group IIIb, group IVa and group IVb in the periodic table, to prepare a mixed sol solution, forming the mixed sol solution into gel, and drying and calcining the gel.

In this production method, a solution of an $NO_x$ storage component is mixed with a solution of oxide sol, and then dried and calcined. The oxide sol comprises fine particles having a specific surface area of approximately 500 $m^2$/g or more, and the $NO_x$ storage component is dispersed on the surface of these fine particles. Therefore, the $NO_x$ storage component is dispersed very highly. Further, sufficient durability against elevated temperatures is maintained on account of high crystallizing temperature.

It must be noted that the $NO_x$ storage component can be dispersed as highly as in this method, by supplying both of the metal oxide and the $NO_x$ storage component in the forms of metal alkoxide and conducting a sol-gel method. In the sol-gel method, however, the costs of raw materials are quite high. The method of the present invention achieves production at a cost of 1/30 or less based on the sol-gel method.

A high heat-resistant catalyst of the present invention, comprises:

a high heat-resistant catalyst support comprising:

an oxide of at least one metal selected from the group consisting of elements of group IIIb, group IVa and group IVb in the periodic table, and an $NO_x$ storage component comprising an oxide of at least one element selected from the group consisting of alkali metals, alkaline-earth metals, and rare-earth elements, the oxide and the $NO_x$ storage component constituting an amorphous composite oxide; and a porous support loaded with a noble metal.

The high heat-resistant catalyst of the present invention comprises the high heat-resistant catalyst support of the present invention and a noble metal-loaded porous support comprising a porous oxide loaded with a noble metal. The noble metal oxidizes NO in exhaust gases into $NO_2$ and make the $NO_2$ adsorbed by the highly dispersed $NO_x$ storage component, while the noble metal reduces $NO_x$ released from the $NO_x$ storage component into innocuous $N_2$.

In the high heat-resistant catalyst of the present invention, the porous support is preferably ceria.

A method of producing a high heat-resistant catalyst of the present invention comprises:

a first step of preparing a high heat-resistant catalyst support powder which comprises an oxide of at least one metal selected from the group consisting of elements of group IIIb, group IVa and group IVb in the periodic table, and an $NO_x$ storage component comprising an oxide of at least one element selected from the group consisting of alkali metals, alkaline-earth metals, and rare-earth elements, the oxide and the $NO_x$ storage component constituting an amorphous composite oxide;

a second step of preparing noble metal-loaded porous support powder by loading a noble metal on a support comprising a porous oxide; and a third step of mixing the high heat-resistant catalyst support powder with the noble metal-loaded porous support powder.

In the method of the present invention, a noble metal is loaded on a porous support to prepare noble metal-loaded porous support powder, and then the noble metal-loaded porous support powder is mixed with the high heat-resistant catalyst support of the present invention. This method prevents the $NO_x$ storage component from eluting in contrast to the conventional platinum loading-by-water absorption method. Consequently, the $NO_x$ storage component can secure a high dispersion. Thus, the method of the present invention can easily produce a catalyst which is superior in heat resistance and $NO_x$ storage ability.

If a noble metal is loaded by the loading-by-water absorption method, when the catalyst support is immersed in a solution including a chemical compound of a noble metal, the $NO_x$ storage component is eluted, which results in a decrease in the loading amount of the $NO_x$ storage component. Further, because the eluted $NO_x$ storage component aggregates on the surface of the catalyst support, the aggregated $NO_x$ storage component reacts with the catalyst support, which results in a decrease in heat resistance.

In the method of producing a high heat-resistant catalyst of the present invention, the porous oxide constituting said support is preferably ceria.

When ceria i.e., cerium oxide is employed as a support comprising a high heat-resistant oxide in the catalyst of the present invention and its production method, since a noble metal is loaded on ceria beforehand, the above elution of the $NO_x$ storage component is not observed. Further, owing to the oxygen storage ability of ceria, the variation in oxygen concentration is small in transitional areas from the stoichiometric point to the fuel-rich atmospheres or the fuel-lean atmospheres, whereby stable purifying performance is obtained.

A high heat-resistant catalyst of the present invention comprises:

a high heat-resistant catalyst support comprising an amorphous composition in which cesium oxide and aluminum oxide have a molar ratio satisfying the following formula:

$1/3>Cs_2O/Al_2O_3>1/90$, and which has been subjected to a thermal treatment at a temperature at which the composition is not crystallized; and a porous support loaded with a noble metal.

In this catalyst of the present invention, since cesium is separated from a noble metal, it is possible to prevent inconveniences caused by the elution of cesium. Further, when cesium is disposed in the vicinity of a noble metal, the oxidation force of the noble metal is often reduced, which results in a decrease in HC conversion. In the present invention, however, since cesium is arranged at some distance from a noble metal, HC conversion can be prevented from decreasing.

Now, the present invention will be described more concretely.

Catalyst Support

Examples of the metal of metal oxide constituting a catalyst support material are aluminium, titanium, silica, and zirconia.

The $NO_x$ storage component comprises at least one element selected from the group consisting of alkali metals, alkaline-earth metals, and rare-earth elements. Examples of alkali metals are lithium, sodium, potassium, rubidium, cesium, and francium. Alkaline-earth metals are elements of group IIa in the periodic table and include barium, beryllium, magnesium, calcium, and strontium. Examples of rare-earth elements are scandium, yttrium, lanthanum, cerium, praseodymium, and neodymium.

The content of the $NO_x$ storage component is preferably 1 to 50 mol based on 100 mol of the catalyst support material. When the content is less than 1 mol, the $NO_x$ storage ability is small and the $NO_x$ purifying performance is deteriorated. On the other hand, when the content exceeds 50 mol, the $NO_x$ storage ability is saturated and at the same time there arises a problem that HC emission increases.

Catalyst Support In Which A Part Of Cs Is Replaced

The element replacing a part of cesium is at least one element selected from the group consisting of alkali metals, alkaline-earth metals, rare-earth elements, and transition elements. Examples of such element is titanium (Ti), potassium (K) and calcium (Ca). When titanium is employed, since titanium is acidic, sulfate is hardly generated and sulfur poison resistance is enhanced. When potassium or calcium is employed, since it forms a composite sulfate of three-element components together with cesium and aluminum, this sulfate has a lower decomposing temperature than sulfates of two-element components, and is more easily removed.

Method of Producing the Catalyst Support

Examples of the solution of oxide sol are aqueous solutions of alumina sol, silica sol, titania sol, zirconia sol or the like. It is preferable that the sol has a specific surface area of 200 m$^2$/g or more. When the specific surface area is smaller than 200 m$^2$/g, the dispersability of the $NO_x$ storage component is lowered. The sol preferably has a concentration of 30% by weight or less. When the sol concentration exceeds 30% by weight, the dispersability of the sol is decreased and accordingly the heat resistance of the resulting catalyst support is degraded.

The mixing molar ratio of the chemical compound of at least one element selected from the group consisting of alkali metals, alkaline-earth metals, and rare-earth elements to the oxide sol lies in the range from 1/2 to 1/100, and preferably in the range from 1/3 to 1/12, when the chemical compound is converted into oxide. When the mixing molar ratio of the chemical compound is more than 1/2, the heat resistance is decreased due to a decrease in dispersibility of the $NO_x$ storage component. When the mixing ratio of the chemical compound is less than 1/100, the $NO_x$ storage ability is decreased and the $NO_x$ purifying performance is degraded, although the heat resistance is not lowered.

Examples of the above chemical compound are hydroxide, chloride, nitrate, and acetate, and aqueous solutions of these chemical compounds can be used.

As a method of mixing the oxide sol with the solution of the chemical compound, any known mixing method can be used such as ultrasonic wave radiation, an ultrasonic homogenizer, stirring, and a ball mill.

Catalyst and Its Production Method

The suitable mixing ratio of the noble metal-loaded porous support (powder) to the high heat-resistant catalyst support (powder) is 50 to 10 parts by weight of the noble metal-loaded porous support (powder) to 50 to 90 parts by weight of the high heat-resistant catalyst support (powder). When the high heat-resistant catalyst support (powder) is less than 50 parts by weight, the $NO_x$ storage ability is lowered.

Catalyst and Its Production Method In Which The Porous Support Is Ceria

Examples of the support material comprising a high heat-resistant oxide are cerium oxide, lanthanum oxide, and zirconium oxide. Among these oxides, cerium oxide is particularly desirable. Owing to the oxygen storage ability of cerium oxide, the variation in oxygen concentration is small in transitional areas from the stoichiometric point to the fuel-rich side or the fuel-lean side, whereby stable purifying performance is obtained. When cerium oxide is employed, the particle diameter of the cerium oxide is desirably not more than 100 angstroms. When the particle diameter is large, the oxygen storage ability is lowered.

Further, it is also preferable to use cerium oxide in which an element of group IVa in the periodic table is solid solved. It is particularly preferable to use cerium oxide stabilizied by solid solving zirconium therein. The amount of the element to be solid solved is desirably 50 mol % or less. When the amount of the element to be solid solved exceeds 50 mol %, the oxygen storage ability of cesium oxide is lowered.

As a method of preparing cerium oxide particles of 100 angstroms or less in particle diameter in which an element of group IVa in the periodic table is solid solved, it is preferable to employ a method of producing the particles from a solution, such as a sol-gel method, a coprecipitation method, a homogeneous precipitation method, a citric acid method, and an atomizing decomposition method. Further, as a method of producing the high heat-resistant catalyst support, it is desirable to employ these methods of producing powder from solutions. It must be noted that calcination in producing the high heat-resistant catalyst support (powder) and the noble metal-loaded porous support (powder) must be done at temperatures at which the resulting powders have specific surface areas of 100 $m^2$/g or more and an amorphous state.

Now, advantages of the present invention will be described hereinafter.

According to the high heat-resistant catalyst support, since the $NO_x$ storage component is highly dispersed, the $NO_x$ storage component is suppressed from crystallizing, and high heat resistance is obtained.

According to the method of producing the high heat-resistant catalyst support, it is possible to stably and easily produce a catalyst support which is amorphous, which has a specific surface area of 100 $m^2$/g or more even when calcined at temperatures of not less than 900° C., in which the $NO_x$ storage component is highly dispersed, and which is superior in heat resistance.

According to the high heat-resistant catalyst, since the high heat-resistant catalyst support of the present invention is employed, high heat-resistance is obtained. According to the method of producing this high heat-resistant catalyst of the present invention, a metal catalyst ingredient is loaded on powder of an oxide such as cerium oxide beforehand, and then mixed with catalyst support powder. Therefore, the $NO_x$ storage component is prevented from eluting and crystallizing. Consequently, the catalyst of the present invention attains a specific surface area of 100 $m^2$/g or more even after a thermal treatment at 800° C., so high heat resistance is obtained.

Further, according to the method of producing a catalyst of the present invention, when the catalyst is used by being distended on a monolith support, the distention is achieved by a single coating, in contrast to a conventional case where the catalyst must be distended by a double or more coating. Thus, production steps can be reduced.

When ceria is employed as a porous support in the catalyst of the present invention and its production method, stable purifying performance can be obtained even in the transitional areas because of the oxygen adsorption and release function of ceria.

According to the high heat-resistant catalyst comprising: a high heat-resistant catalyst support comprising an amorphous composition in which cesium oxide and aluminum oxide have a molar ratio satisfying the following formula:

$$1/3 > Cs_2O/Al_2O_3 > 1/90,$$

and which has been subjected to a thermal treatment at a temperature at which the composition is not crystallized; and a porous support loaded with a noble metal, the oxidation force of the noble metal catalyst ingredient is prevented from decreasing, and as a result, HC conversion is suppressed from decreasing, in addition to the fact that the advantages of the above catalyst are obtained.

PREFERRED EMBODIMENTS OF THE PRESENT INVENTION

The exact nature of this invention, as well as other objects and advantages thereof, will be readily apparent from consideration of the description of preferred embodiments of the present invention.

A First Series of Preferred Embodiments Concerning a Catalyst Support

EXAMPLE 1

27.8 g of cesium acetate and 118.5 g of aluminum triisopropoxide were dissolved in 450 ml of 2-propanol. After stirred with a reflux at 80° C. for two hours, this solution was mixed with 14.5 g of 2,4-pentanedione, and further stirred for three hours. Then, while the solution was held at 80° C., a mixed solution of 67.9 ml of ion exchange water and 100 ml of 2-propanol was dropped into the solution. After stirred at 80° C. for five hours, the resulting solution was vacuum dried to obtain white powder.

This powder was air calcined at 800° C. for five hours, thereby preparing a catalyst support of Example 1. This catalyst support had a specific surface area of 68 $m^2$/g. An X-ray diffraction analysis revealed that cesium and aluminum constituted an amorphous composite oxide, and that cesium was highly dispersed in aluminum. Cesium and aluminum were contained as oxides at a molar ratio of $Cs_2O/Al_2O_3=1/4$.

EXAMPLE 2

A catalyst support of Example 2 was prepared in the same way as that of Example 1, with the exception of using 16.0 g of cesium acetate, 153.3 g of aluminum triisopropoxide, 580 ml in total of 2-propanol, and 84.0 ml of ion exchange water.

This catalyst support had a specific surface area of 161 $m^2$/g. An X-ray diffraction analysis showed that cesium and aluminum constituted an amorphous composite oxide, and that cesium was highly dispersed in aluminum. Cesium and aluminum were contained as oxides at a molar ratio of $Cs_2O/Al_2O_3=1/9$.

EXAMPLE 3

A catalyst support of Example 3 was prepared in the same way as that of Example 1, with the exception of using 13.7 g of cesium acetate, 160 g of aluminum triisopropoxide, 603 ml in total of 2-propanol, 17.1 g of 2,4-pentanedione, and 87.3 ml of ion exchange water.

This catalyst support had a specific surface area of 178 $m^2/g$. An X-ray diffraction analysis indicated that cesium and aluminum constituted an amorphous composite oxide, and that cesium was highly dispersed in aluminum. Cesium and aluminum were contained as oxides at a molar ratio of $Cs_2O/Al_2O_3=1/11$.

EXAMPLE 4

A catalyst support of Example 4 was prepared in the same way as that of Example 1, with the exception of using 7.6 g of cesium acetate, 178 g of aluminum triisopropoxide, 670 ml in total of 2-propanol, 18.2 g of 2,4-pentanedione, and 95.6 ml of ion exchange water.

This catalyst support had a specific surface area of 202 $m^2/g$. An X-ray diffraction analysis proved that cesium and aluminum constituted an amorphous composite oxide, and that cesium was highly dispersed in aluminum. Cesium and aluminum were contained as oxides at a molar ratio of $Cs_2O/Al_2O_3=1/22$.

EXAMPLE 5

A catalyst support of Example 5 was prepared in the same way as Example 1, with the exception of using 2.1 g of cesium acetate, 194.2 g of aluminum triisopropoxide, 731 ml in total of 2-propanol, 19.3 g of 2,4-pentanedione, and 103.2 ml of ion exchange water.

This catalyst support had a specific surface area of 227 $m^2/g$. An X-ray diffraction analysis demonstrated that cesium and aluminum constituted an amorphous composite oxide, and that cesium was highly dispersed in aluminum. Cesium and aluminum were contained as oxides at a molar ratio of $Cs_2O/Al_2O_3=1/88$.

EXAMPLE 6

A catalyst support of Example 6 was prepared in the same way as that of Example 1, with the exception of using 32.7 g of cesium acetate, 104.3 g of aluminum triisopropoxide, 495 ml in total of 2-propanol, 13.6 g of 2,4-pentanedione, and 61.3 ml of ion exchange water.

This catalyst support had a specific surface area of 8 $m^2/g$. An X-ray diffraction analysis revealed that cesium and aluminum constituted an amorphous composite oxide. Cesium and aluminum were contained as oxides at a molar ratio of $Cs_2O/Al_2O_3=1/3$.

EXAMPLE 7

A catalyst support of Example 7 was prepared in the same way as that of Example 1, with the exception of using 2.0 g of cesium acetate, 194.4 g of aluminum triisopropoxide, 731 ml in total of 2-propanol, 19.3 g of 2,4-pentanedione, and 103.3 ml of ion exchange water.

This catalyst support had a specific surface area of 230 $m^2/g$. An X-ray diffraction analysis showed that cesium and aluminum constituted an amorphous composite oxide. Cesium and aluminum were contained as oxides at a molar ratio of $Cs_2O/Al_2O_3=1/90$.

EXAMPLE 8

11.1 g of cesium acetate, 1.4 g of calcium nitrate, and 160.1 g of aluminum triisopropoxide were dissolved in 600 ml of 2-propanol. After stirred with a reflux at 80° C. for two hours, this solution was mixed with 17.1 g of 2,4-pentanedione and further stirred for three hours. Then, while this solution was held at 80° C., a mixed solution of 87.3 ml of ion exchange water and 100 ml of 2-propanol was dropped into the solution. After stirred at 80° C. for five hours, the resulting solution was vacuum dried to obtain white powder.

This powder was air calcined at 800° C. for five hours, thereby preparing a catalyst support of Example 8. This catalyst support had a specific surface area of 152 $m^2/g$. An X-ray diffraction analysis indicated that cesium, calcium, and aluminum constituted an amorphous composite oxide, and that cesium and calcium were highly dispersed in aluminum. Cesium and calcium, and aluminum were contained as oxides at a molar ratio of $(Cs_2O+CaO)/Al_2O_3=1/11$.

EXAMPLE 9

A catalyst support of Example 9 was prepared in the same way as that of Example 8, except that 4.0 g of titanium tetraisopropoxide was used instead of 1.4 g of calcium nitrate.

This catalyst support had a specific surface area of 148 $m^2/g$. An X-ray diffraction analysis proved that cesium, titanium, and aluminum constituted an amorphous composite oxide, and that cesium and titanium were highly dispersed in aluminum. Cesium and titanium, and aluminum were contained as oxides at a molar ratio of $(Cs_2O+TiO_2)/Al_2O_3=1/11$.

EXAMPLE 10

A catalyst support of Example 10 was prepared in the same way as Example 8, except that 1.4 g of potassium acetate was used instead of 1.4 g of calcium nitrate.

This catalyst support had a specific surface area of 157 $m^2/g$. An X-ray diffraction analysis demonstrated that cesium, potassium, and aluminum constituted an amorphous composite oxide, and that cesium and potassium were highly dispersed in aluminum. Cesium and potassium, and aluminum were contained as oxides at a molar ratio of $(Cs_2O+K_2O)/Al_2O_3=1/11$.

EXAMPLE 11

A catalyst support of Example 11 was prepared in the same way as that of Example 8, except that 2.9 g of lanthanum nitrate was used instead of 1.4 g of calcium nitrate.

This catalyst support had a specific surface area of 143 $m^2/g$. An X-ray diffraction analysis revealed that cesium, lanthanum, and aluminum constituted an amorphous composite oxide, and that cesium and lanthanum were highly dispersed in aluminum. Cesium and lanthanum, and aluminum were contained as oxides at a molar ratio of $(Cs_2O+La_2O_3)/Al_2O_3=1/11$.

EXAMPLE 12

10.9 g of diisopropoxy barium and 104.3 g of aluminum triisopropoxide were dissolved in 430 ml of 2-propanol.

After stirred with a reflux at 80° C. for two hours, this solution was mixed with 16.6 g of 2,4-pentanedione and further stirred for three hours. While this solution was held at 80° C., a mixed solution of 58.3 ml of ion exchange water and 150 ml of 2-propanol was dropped into the solution. After stirred at 80° C. for five hours, the resulting solution was vacuum dried to obtain white powder.

This powder was air calcined at 800° C. for five hours, thereby preparing a catalyst support of Example 12. This catalyst support had a specific surface area of 235 m²/g. An X-ray diffraction analysis showed that barium and aluminum constituted an amorphous composite oxide, and that barium was highly dispersed in aluminum. Barium and aluminum were contained as oxides at a molar ratio of $BaO/Al_2O_3=1/6$. Preparation of Catalysts Catalyst support powder of each of the above examples was mixed at the ratio of 10 g of the atalyst support powder to 100 ml of a solution of platinum dinitrodiammine nitrate in 2-propanol containing platinum in an amount of 0.008 mol, and stirred at room temperature for one hour. Then, powder was separated by centrifugation, dried at 120° C. for 12 hours, and subjected to a thermal treatment at 250° C. for one hour, thereby loading platinum. The loading amount of platinum was 1.12% by weight.

30 parts by weight of zirconia sol containing zirconia in an amount of 30% by weight, and 400 ml of 2-propanol were added to 100 parts by weight of this Pt-loaded catalyst support powder, thereby preparing slurry. A honeycomb support formed of cordierite was immersed in this slurry, and then pulled up and blown to remove excessive slurry. Then, it was dried at 120° C. for three hours and calcined at 500° C. for one hour, thereby preparing each catalyst. The coating amount of the slurry was 150 g with respect to 1 liter of the honeycomb support.

Comparative Example 1

Gamma-alumina powder having a specific surface area of 150 m²/g was prepared as a catalyst support of Comparative Example 1, and platinum was loaded on the support in the same way as above. Then the obtained Pt-loaded powder was immersed in a barium acetate aqueous solution containing barium by 25% by weight of that powder. After stirred for one hour, the solution was evaporated to dryness, thereby obtaining powder. After dried at 120° C. for 12 hours, the powder was subjected to a thermal treatment at 500° C. for one hour, thereby loading barium. The loading amount of barium was 25% by weight.

This catalyst powder was made into slurry and coated on a honeycomb support in the same way as above, and subjected to a thermal treatment, thereby obtaining a catalyst.

Comparative Example 2

A catalyst support of Comparative Example 2 was prepared in the same way as that of Comparative Example 1, except that a cesium nitrate aqueous solution containing cesium by 25% by weight of the Pt-loaded catalyst support powder, and made into a catalyst in the same way as in Comparative Example 1.

EXAMINATION AND EVALUATION

Initial Conversion

Each of the honeycomb catalysts of the examples of the present invention and the comparative examples was examined about the average conversions of CO, HC and $NO_x$ by introducing lean model gas and stoichiometric model gas shown in Table 1 alternately for one minute each at gas hourly space velocity of 100,000 at inlet gas temperatures of 300° C., 400° C. and 500° C. The results are shown in Table 2.

Conversion After Durability Test

Each of the honeycomb catalysts of the examples of the present invention and the comparative examples was subjected to a durability test in which the lean model gas shown in Table 1 for four minutes and the stoichiometric model gas shown in Table 1 for one minute were alternately introduced to the catalyst bed at an inlet gas temperature of 800° C. for ten hours in total. Then each catalyst was examined about conversion after the durability test in the same way as the above initial conversion was examined.

TABLE 1

|  | CO % | $C_3H_6$ ppm | $CO_2$ % | $O_2$ % | $H_2O$ % | NO ppm | $SO_2$ ppm | $N_2$ |
|---|---|---|---|---|---|---|---|---|
| LEAN MODEL GAS | 0.1 | 800 | 12.0 | 4.5 | 10 | 1000 | 200 | BALANCE |
| STOICHIOMETRIC MODEL GAS | 0.75 | 800 | 10.0 | VARIABLE | 10 | 1000 | 200 | BALANCE |

TABLE 2

| | | | INLET GAS TEMP. 300° C. | | | | | | INLET GAS TEMP. 400° C. | | | | | | INLET GAS TEMP. 500° C. | | | | | |
|---|---|---|---|---|---|---|---|---|---|---|---|---|---|---|---|---|---|---|---|---|
| | METAL EXCEPT | $MO_x$ | INITIAL CONVERSION (%) | | | CONVERSION AFTER DURABILITY TEST (%) | | | INITIAL CONVERSION (%) | | | CONVERSION AFTER DURABILITY TEST (%) | | | INITIAL CONVERSION (%) | | | CONVERSION AFTER DURABILITY TEST (%) | | |
| | Al | $Al_2O_3$ | CO | HC | NOx | CO | HC | NOx | CO | HC | NOx | CO | HC | NOx | CO | HC | NOx | CO | HC | NOx |
| EXAMPLES | | | | | | | | | | | | | | | | | | | | | |
| 1 | Cs | 1/4 | 100 | 45 | 95 | 96 | 43 | 78 | 100 | 59 | 97 | 96 | 55 | 81 | 99 | 84 | 98 | 95 | 80 | 80 |
| 2 | Cs | 1/9 | 100 | 49 | 97 | 94 | 45 | 80 | 100 | 86 | 98 | 95 | 80 | 82 | 100 | 91 | 97 | 94 | 87 | 81 |
| 3 | Cs | 1/11 | 99 | 68 | 97 | 93 | 64 | 83 | 99 | 90 | 98 | 94 | 84 | 85 | 100 | 97 | 95 | 95 | 91 | 82 |
| 4 | Cs | 1/22 | 98 | 69 | 98 | 94 | 65 | 81 | 99 | 92 | 98 | 95 | 87 | 82 | 100 | 99 | 95 | 95 | 92 | 80 |

TABLE 2-continued

| | METAL EXCEPT Al | MO$_x$ Al$_2$O$_3$ | INLET GAS TEMP. 300° C. | | | | | | INLET GAS TEMP. 400° C. | | | | | | INLET GAS TEMP. 500° C. | | | | | |
|---|---|---|---|---|---|---|---|---|---|---|---|---|---|---|---|---|---|---|---|---|
| | | | INITIAL CONVERSION (%) | | | CONVERSION AFTER DURABILITY TEST (%) | | | INITIAL CONVERSION (%) | | | CONVERSION AFTER DURABILITY TEST (%) | | | INITIAL CONVERSION (%) | | | CONVERSION AFTER DURABILITY TEST (%) | | |
| | | | CO | HC | NOx | CO | HC | NOx | CO | HC | NOx | CO | HC | NOx | CO | HC | NOx | CO | HC | NOx |
| 5 | Cs | 1/88 | 97 | 87 | 87 | 93 | 84 | 81 | 98 | 100 | 79 | 94 | 96 | 74 | 100 | 100 | 45 | 94 | 95 | 39 |
| 6 | Cs | 1/3 | 100 | 39 | 76 | 60 | 29 | 45 | 100 | 54 | 80 | 65 | 43 | 48 | 100 | 79 | 79 | 65 | 64 | 46 |
| 7 | Cs | 1/90 | 96 | 95 | 56 | 93 | 81 | 37 | 98 | 100 | 41 | 94 | 89 | 31 | 99 | 100 | 12 | 94 | 90 | 3 |
| 8 | Cs + Ca | 1/11 | 97 | 89 | 91 | 93 | 83 | 86 | 99 | 99 | 93 | 95 | 94 | 89 | 100 | 100 | 90 | 95 | 95 | 87 |
| 9 | Cs + Ti | 1/11 | 98 | 90 | 90 | 95 | 83 | 88 | 98 | 100 | 92 | 95 | 93 | 90 | 99 | 100 | 91 | 96 | 94 | 87 |
| 10 | Cs + K | 1/11 | 98 | 90 | 94 | 95 | 83 | 87 | 99 | 100 | 96 | 96 | 92 | 88 | 100 | 100 | 95 | 96 | 93 | 86 |
| 11 | Cs + La | 1/11 | 98 | 89 | 90 | 95 | 85 | 86 | 99 | 94 | 95 | 96 | 90 | 87 | 99 | 96 | 92 | 94 | 92 | 85 |
| 12 | Ba | 1/6 | 97 | 98 | 98 | 94 | 91 | 78 | 98 | 99 | 76 | 95 | 92 | 43 | 98 | 99 | 11 | 94 | 92 | 2 |
| COMPARATIVE EXAMPLES | | | | | | | | | | | | | | | | | | | | |
| 1 | Ba | 1/4 | 100 | 96 | 97 | 95 | 91 | 31 | 100 | 100 | 39 | 96 | 92 | 9 | 100 | 100 | 4 | 96 | 92 | 1 |
| 2 | Cs | 1/8 | 97 | 37 | 89 | 93 | 31 | 51 | 99 | 53 | 92 | 94 | 47 | 52 | 99 | 68 | 92 | 94 | 60 | 50 |

Evaluation

As apparent from Table 2, the catalysts of Examples 6 and 7 whose compositions fell in the range of claim 1 but whose cesium contents were out of the range of claim 2 were deteriorated in initial NO$_x$ conversion and NO$_x$ conversion after the durability test.

Table 2 also demonstrates that the catalysts of Examples 8 to 11 in which a part of cesium was replaced with other metals were improved in NO$_x$ conversion after the durability test than the catalysts of Examples 1 to 7 in which no part of cesium was replaced with other metals.

Further, in Comparative Examples 1 and 2, since alumina and each NO$_x$ storage component did not constitute an amorphous composite oxide, there was a decrease in dispersability of the NO$_x$ storage component, and as a result, Comparative Examples 1 and 2 were deteriorated in initial NO$_x$ conversion and NO$_x$ conversion after the durability test to Examples 12 and 2.

The catalyst of Example 12 showed a sharp decrease in initial NO$_x$ conversion and NO$_x$ conversion after the durability test at the elevated inlet gas temperatures, although they were better than those of Comparative Example 1. This was because BaSO$_4$, which could not be easily decomposed, was generated due to sulfur poisoning. In the case where cesium was used with aluminum, however, even when the catalysts were poisoned by sulfur, generated sulfate could be easily decomposed at low temperatures, and produced little influence on NO$_x$ conversion so that NO$_x$ conversion after the durability test was less deteriorated.

A Second Series of Preferred Embodiments Concerning a Method of Producing a Catalyst Support

EXAMPLE 13

An aqueous solution of alumina sol having a concentration of 10% by weight and a specific surface area of 500 m$^2$/g, an aqueous solution of barium hydroxide, water, and a small amount of acetic acid were mixed, and stirred at room temperature for five hours, while subjected to ultrasonic wave radiation.

This mixed sol solution was heated in a water bath at 80° C. to be formed into gel, and dried at 120° C. 4 for hours, thereby producing a catalyst support of Example 13. The molar ratio of barium to aluminum as oxides was BaO/Al$_2$O$_3$=1/3.

EXAMPLE 14

A catalyst support of Example 14 was produced in the same way as that of Example 13, except that the mixing ratio of alumina sol to barium hyroxide was controlled so that the molar ratio of barium to aluminum as oxides was BaO/Al$_2$O$_3$=1/6.

EXAMPLE 15

A catalyst support of Example 15 was produced in the same way as that of Example 13, except that alumina sol having a concentration of 20% by weight and a specific surface area of 500 m$^2$/g was used, and that potassium nitrate was used instead of barium hydroxide. The molar ratio of potassium to aluminum as oxides was K$_2$O/Al$_2$O$_3$=1/6.

EXAMPLE 16

A catalyst support of Example 16 was produced in the same way as that of Example 15, except that the mixing ratio of potassium nitrate to alumina sol was controlled so that the molar ratio of potassium to aluminum as oxides was K$_2$O/Al$_2$O$_3$=1/11.

EXAMPLE 17

A catalyst support of Example 17 was produced in the same way as that of Example 13 by employing the same alumina sol as in Example 13, except that cesium nitrate was used instead of barium hydroxide. The molar ratio of cesium to aluminum as oxides was Cs$_2$O/Al$_2$O$_3$=1/11.

EXAMPLE 18

A catalyst support of Example 18 was produced in the same way as that of Example 13 by employing the same alumina sol as in Example 13, except that lanthanum nitrate was used instead of barium hydroxide. The molar ratio of lanthanum to aluminum as oxides was La$_2$O$_3$/Al$_2$O$_3$=1/3.

EXAMPLE 19

Titania sol having a concentration of 10% by weight and a specific surface area of 550 m$^2$/g, barium hydroxide, water, and a small amount of acetic acid were mixed, and stirred at room temperature for five hours, while subjected to ultrasonic wave radiation.

This mixed sol solution was heated in a water bath at 80° C. to be formed into gel, and dried at 120° C. for four hours, thereby producing a catalyst support of Example 19. The molar ratio of barium to titanium as oxides was BaO/TiO$_2$=1/4.

EXAMPLE 20

Silica sol having a concentration of 5% by weight and a specific surface area of 600 m$^2$/g, barium hydroxide, water, and a small amount of acetic acid were mixed and stirred at room temperature for five hours, while subjected to ultrasonic wave radiation. This mixed sol solution was heated in a water bath at 80° C. to be formed into gel, and dried at 120° C. for four hours, thereby producing a catalyst support of Example 20. The molar ratio of barium to silicon as oxides was BaO/SiO$_2$=3/5.

Comparative Example 3

Triisopropoxy aluminum and diisopropoxy barium were respectively weighed, and dissolved in 2-propanol at 80° C. This mixed solution was made into gel by a hydrolysis treatment. After the resulting gel was aged at 80° C. for five hours, 2-propanol was recovered by vibration-fluidized drying. The obtained dried powder was calcined at 450° C., thereby preparing a catalyst support of Comparative Example 3. The molar ratio of barium to aluminum as oxides was BaO/Al$_2$O$_3$=1/3.

Comparative Example 4

A catalyst support of Comparative Example 4 was produced in the same way as that of Comparative Example 3, except that the mixing ratio of barium alkoxide to aluminum alkoxide was controlled so that the molar ratio of barium to aluminum as oxides was BaO/Al$_2$O$_3$=1/6.

Comparative Example 5

Activated alumina powder having a specific surface area of 200 m$^2$/g, and barium acetate were weighed. Then the activated alumina powder was mixed in an aqueous solution of the barium acetate, whereby barium was loaded on activated alumina by impregnation at room temperature. Then, the entire material was dried and calcined at 500° C. for five hours, thereby producing a catalyst support of Comparative Example 5. The molar ratio of barium to aluminum as oxides was BaO/Al$_2$O$_3$=1/3.

Comparative Example 6

A catalyst support of Comparative Example 6 was produced in the same way as that of Comparative Example 5, except that the mixing ratio of the respective powders was controlled so that the molar ratio of barium to aluminum as oxides was BaO/Al$_2$O$_3$=1/6.

Examination and Evaluation

The respective catalyst supports were respectively air calcined at temperatures shown in Table 3 for five hours. Then, their specific surface areas were measured, and the results are shown in Table 3. Besides, the crystal structure of the respective catalyst supports after the above calcination was investigated by an X-ray diffraction analysis, and the results are shown in Table 3. Table 3 also indicates a comparison in the production cost of the respective catalyst supports, when the production cost of the catalyst support of Comparative Example 3 is regarded as 1.

Table 3 shows that the catalyst supports of the examples of the present invention exhibited as high specific surface areas as 100 m$^2$/g or more even when calcined at temperatures of 900° C. or more, so, they were superior in heat resistance.

On the other hand, Table 3 also demonstrates that the catalyst supports of Comparative Examples 5 and 6 exhibited a remarkable decrease in specific surface area due to calcination, so, they were poor in heat resistance. This was because the catalyst supports of Comparative Examples 5 and 6 were not amorphous but crystalline.

Although the catalyst supports of Comparative Examples 3 and 4 possessed large specific surface areas, amorphous states, and superior heat resistance, their production costs were extremely higher than those of the examples of the present invention.

TABLE 3

| | | No. STORAGE COMPONENT | | SPECIFIC SURFACE AREA (m$^2$/g) CALCINATION TEMP. (° C.) | | | CRYSTAL | |
|---|---|---|---|---|---|---|---|---|
| | OXIDE SOURCE | SOURCE | COMPOSITION | 800 | 900 | 1000 | STRUCTURE | COST RATIO |
| EXAMPLES | | | | | | | | |
| 13 | ALUMINA SOL | Ba(OH)$_2$ | BaO/Al$_2$O$_3$ = 1/3 | 128 | 105 | — | AMORPHOUS | 0.02 |
| 14 | ALUMINA SOL | Ba(OH)$_2$ | BaO/Al$_2$O$_3$ = 1/6 | 163 | 120 | 107 | AMORPHOUS | 0.01 |
| 15 | ALUMINA SOL | KNO$_3$ | K$_2$O/Al$_2$O$_3$ = 1/6 | 134 | — | 102 | AMORPHOUS | 0.05 |
| 16 | ALUMINA SOL | KNO$_3$ | K$_2$O/Al$_2$O$_3$ = 1/11 | 146 | — | 101 | AMORPHOUS | 0.02 |
| 17 | ALUMINA SOL | CsNO$_3$ | Cs$_2$O/Al$_2$O$_3$ = 1/11 | 185 | — | 121 | AMORPHOUS | 0.15 |
| 18 | ALUMINA SOL | La(NO$_3$)$_3$ | La$_2$O$_3$/Al$_2$O$_3$ = 1/3 | — | — | 100 | AMORPHOUS | 0.05 |
| 19 | TITANIA SOL | Ba(OH)$_2$ | BaO/TiO$_2$ = 1/4 | 125 | — | 117 | AMORPHOUS | 0.01 |
| 20 | SILICA SOL | Ba(OH)$_2$ | BaO/SiO$_2$ = 3/5 | 112 | — | 103 | AMORPHOUS | 0.01 |

TABLE 3-continued

| No. | OXIDE SOURCE | STORAGE COMPONENT SOURCE | COMPOSITION | SPECIFIC SURFACE AREA (m²/g) CALCINATION TEMP. (° C.) | | | CRYSTAL STRUCTURE | COST RATIO |
|---|---|---|---|---|---|---|---|---|
| | | | | 800 | 900 | 1000 | | |
| COMPARATIVE EXAMPLES | | | | | | | | |
| 3 | Al(OC$_3$H$_7$)$_3$ | Ba(OC$_3$H$_7$)$_2$ | BaO/Al$_2$O$_3$ = 1/3 | 132 | — | 111 | AMORPHOUS | 1.0 |
| 4 | Al(OC$_3$H$_7$)$_3$ | Ba(OC$_3$H$_7$)$_2$ | BaO/Al$_2$O$_3$ = 1/6 | — | — | 124 | AMORPHOUS | 1.0 |
| 5 | ACTIVATED ALUMINA | Ba(CH$_3$COO)$_2$ | BaO/Al$_2$O$_3$ = 1/3 | 76 | — | 32 | CRYSTALLINE | 0.05 |
| 6 | ACTIVATED ALUMINA | Ba(CH$_3$COO)$_2$ | BaO/Al$_2$O$_3$ = 1/6 | — | — | 52 | CRYSTALLINE | 0.02 |

A Third Series of Preferred Embodiments Concerning a Catalyst and its Production Method

EXAMPLE 21

First Step

Aluminum alkoxide and barium alkoxide were weighed so that the molar ratio of aluminum to barium was Al$_2$O$_3$/BaO=1/3 when converted to oxides. Then the aluminum alkoxide and barium alkoxide were dissolved into propanol at 80° C., and acetyl alcohol as a hydrolysis inhibitor was added. Further, necessary water for hydrolysis was dropped, and the solution was aged at 80° C. for five hours to obtain uniform gel. This gel was subjected to a vibration-fluidized drier and the solvent was recovered and the resulting material was ground to obtain dried power. This powder was calcined first at 450° C., and then at 900° C. for five hours, thereby preparing catalyst support powder. The catalyst support powder after calcination was examined about crystal structure by an X-ray diffraction analysis, and about specific surface area.

Second Step

Cerium nitrate and zirconium nitrate were weighed so that the molar ratio of cerium to zirconium was CeO$_2$/ZrO$_2$=5/1 when converted to oxides, and dissolved into distilled water at 60° C. to prepare a mixed solution. Urea was added to this mixed solution to allow uniform precipitate. Then, the precipitate was recovered while washed with distilled water, dried at 120° C., and calcined at 900° C. for five hours. The particle diameter of the powder after calcination was measured by microscopic observation, and the specific surface area of the powder after calcination was also measured.

After that, this powder was mixed in a predetermined amount of a platinum dinitrodiammine aqueous solution having a predetermined concentration. Then, after dried, the mixed solution was calcined at 250° C., thereby preparing Pt-loaded powder. The loading amount of plataimum was 2% by weight.

Third Step 100 parts by weight of the above catalyst support powder, and 30 parts by weight of the above Pt-loaded powder, and 180 parts by weight of propanol were commingled to prepare slurry. A honeycomb monolith was immersed in this slurry. After pulled up and blown away to remove excessive slurry, the monolith was dried at 120° C. and subjected to a thermal treatment at 500° C., thereby preparing a catalyst.

Supernatant liquid of the employed slurry was collected and examined about the eluting amount of barium. Further, the specific surface area of the coating layer after the thermal treatment was measured, and the composition of that coating layer was determined by an X-ray diffraction analysis. The results are shown in Table 4.

EXAMPLE 22

A catalyst of Example 22 was prepared in the same way as that of Example 21, except that aluminum alkoxide and barium alkoxide were employed so that the molar ratio of aluminum to barium was Al$_2$O$_3$/BaO=1/6 when converted to oxides, and that the calcination temperatures in the first step and the second step were 1000° C. Similarly, supernatant liquid of the employed slurry was collected and examined about the eluting amount of barium. The specific surface area of the coating layer after the thermal treatment was measured, and the composition of that coating layer was determined by an X-ray diffraction analysis. The results are shown in Table 4.

EXAMPLE 23

A catalyst of Example 23 was prepared in the same way as that of Example 21, except that aluminum alkoxide and barium alkoxide were employed so that the molar ratio of aluminum to barium was Al$_2$O$_3$/BaO=1/12 when converted to oxides, and that the calcination temperatures in the first step and the second step were 1,000° C. Similarly, supernatant liquid of the employed slurry was collected and examined about the eluting amount of barium. Further, the specific surface area of the coating layer after the thermal treatment was measured, and the composition of that coating layer was determined by an X-ray diffraction analysis. The results are shown in Table 4.

EXAMPLE 24

A catalyst of Example 24 was prepared in the same way as that of Example 22, except that cerium nitrate and zirconium nitrate were employed in the second step so that the molar ratio of cerium to zirconium was CeO$_2$/ZrO$_2$=3/1 when converted to oxides. Similarly, supernatant liquid of the employed slurry was collected and examined about the eluting amount of barium. Further, the specific surface area of the coating layer after the thermal treatment was measured, and the composition of that coating layer was determined by an X-ray diffraction analysis. The results are shown in Table 4.

EXAMPLE 25

A catalyst of Example 25 was prepared in the same way as that of Example 21, except that aluminum alkoxide and cesium alkoxide were employed so that the molar ratio of aluminum to cesium was $Al_2O_3/Cs_2O=1/6$ when converted to oxides, and that the calcination temperatures in the first step and the second step were 1000° C. Similarly, supernatant liquid of the employed slurry was collected and examined about the eluting amount of cesium. Further, the specific surface area of the coating layer after the thermal treatment was measured, and the composition of that coating layer was determined by an X-ray diffraction analysis. The results are shown in Table 4.

EXAMPLE 26

A catalyst of Example 26 was prepared in the same way as that of Example 21, except that aluminum alkoxide and cesium alkoxide were employed so that the molar ratio of aluminum to cesium was $Al_2O_3/Cs_2O=1/11$ when converted to oxides, and that the calcination temperatures in the first step and the second step were 1000° C. Similarly, supernatant liquid of the employed slurry was collected and examined about the eluting amount of cesium. Further, the specific surface area of the coating layer after the thermal treatment was measured, and the composition of that coating layer was determined by an X-ray diffraction analysis. The results are shown in Table 4.

EXAMPLE 27

A catalyst of Example 27 was prepared in the same way as that of Example 21, except that aluminum alkoxide and lanthanum alkoxide were employed so that the molar ratio of aluminum to lanthanum was $Al_2O_3/La_2O_3=1/3$ when converted to oxides, and that the calcination temperatures in the first step and the second step were 1,000° C. Similarly, supernatant liquid of the employed slurry was collected and measured about the eluting amount of lanthanum. The specific surface area of the coating layer after the thermal treatment was measured, and the composition of that coating layer was determined by an X-ray diffraction analysis. The results are shown in Table 4.

EXAMPLE 28

A catalyst of Example 28 was prepared in the same way as that of Example 21, except that aluminum alkoxide and lanthanum alkoxide were employed so that the molar ratio of aluminum to lanthanum was $Al_2O_3/La_2O_3=1/6$ when converted to oxides, and that the calcination temperatures in the first step and the second step were 1,0000° C. Similarly, supernatant liquid of the employed slurry was collected and examined about the eluting amount of lanthanum. Further, the specific surface area of the coating layer after the thermal treatment was measured, and the composition of that coating layer was determined by an X-ray diffraction analysis. The results are shown in Table 4.

Comparative Example 7

The catalyst support powder prepared in Example 21 and comprising a composite oxide of barium and aluminum was impregnated with a predetermined amount of a platinum dinitrodiammine aqueous solution having a predetermined concentration, and calcined at 250° C., thereby loading platinum. Supernatant liquid of the mixed solution of the catalyst support powder and the platinum dinitrodiammine aqueous solution was collected and examined about the eluting amount of barium. Further, the specific surface area of the coating layer after a thermal treatment at 800° C. was measured, and the composition of that coating layer was determined by an X-ray diffraction analysis. The results are shown in Table 4.

Comparative Example 8

Catalyst support powder prepared in Example 22 and comprising a composite oxide of barium and aluminum was impregnated with a predetermined amount of a platinum dinitrodiammine aqueous solution having a predetermined concentration, and calcined at 250° C., thereby loading platinum. Supernatant liquid of the mixed solution of the catalyst support powder and the platinum dinitrodiammine aqueous solution was collected and examined about the eluting amount of barium. Further, the specific surface area of the coating layer after a thermal treatment at 800° C. was measured, and the composition of that coating layer was determined by an X-ray diffraction analysis. The results are shown in Table 4.

Comparative Example 9

Catalyst support powder prepared in Example 23 and comprising a composite oxide of barium and aluminum was impregnated with a predetermined amount of a platinum dinitrodiammine aqueous solution having a predetermined concentration, and calcined at 250° C., thereby loading platinum. Supernatant liquid of the mixed solution of the catalyst support powder and the platinum dinitrodiammine aqueous solution was collected and examined about the eluting amount of barium. The specific surface area of the coating layer after a thermal treatment at 800° C. was measured, and the composition of that coating layer was determined by an X-ray diffraction analysis. The results are shown in Table 4.

Comparative Example 10

Catalyst support powder prepared in Example 21 and comprising a composite oxide of barium and aluminum was mixed with cerium oxide powder in which zirconium was solid solved at the same mixing ratio as in Example 21. The mixed powder was impregnated with a predetermined amount of a platinum dinitrodiammine aqueous solution having a predetermined concentration, and calcined at 250° C., thereby loading platinum. Supernatant liquid of the mixed solution of the catalyst support powder and the platinum dinitrodiammine aqueous solution was collected and examined about the eluting amount of barium. Further, the specific surface area of the coating layer after a thermal treatment at 800° C. was measured, and the composition of that coating layer was determined by an X-ray diffraction analysis. The results are shown in Table 4.

Comparative Example 11

Catalyst support powder prepared in Example 22 and comprising a composite oxide of barium and aluminum was mixed with cerium oxide powder in which zirconium was solid solved at the same mixing ratio as in Example 22. This mixed powder was impregnated with a predetermined amount of a platinum dinitrodiammine aqueous solution having a predetermined concentration, and calcined at 250° C., thereby loading platinum. Supernatant liquid of the mixed solution of the catalyst support powder and the platinum dinitrodiammine aqueous solution was collected, and examined about the eluting amount of barium. The specific surface area of the coating layer after a thermal treatment at 800° C. was measured, and the composition of that coating layer was determined by an X-ray diffraction analysis. The results are shown in Table 4.

Comparative Example 12

Catalyst support powder prepared in Example 23 and comprising a composite oxide of barium and aluminum was mixed with cerium oxide powder in which zirconium was solid solved at the same mixing ratio as in Example 23. This mixed powder was impregnated with a predetermined amount of a platinum dinitrodiammine aqueous solution having a predetermined concentration, and calcined at 250° C., thereby loading platinum. Supernatant liquid of the mixed solution of the catalyst support powder and the platinum dinitrodiammine aqueous solution was collected and examined about the eluting amount of barium. The specific surface area of the coating layer after a thermal treatment at 800° C. was measured, and the composition of that coating layer was determined by an X-ray diffraction analysis. The results are shown in Table 4.

Evaluation

As apparent from Table 4, in the comparative examples, the elution of barium was observed, and after the thermal treatments, the reaction of barium and aluminum generated $BaAl_2O_4$ crystals, which caused a decrease in specific surface area. In the examples of the present invention, however, the elution of the $NO_x$ storage components was not observed, and the amorphous state and high specific surface area was maintained even after the thermal treatments. Thus, the heat resistance was excellent.

A Third Series of Preferred Embodiments Concerning a Catalyst Using a Catalyst Support Using Cesium Oxide and Alumina

EXAMPLE 29

A predetermined amount of alumina powder was impregnated with a predetermined amount of a platinum dinitrodiammine nitrate aqueous solution, dried at 120° C., and calcined at 250° C., thereby obtaining Pt-loaded powder. The loading amount of platinum was 2% by weight.

TABLE 4

| | | | | | | Pt-LOADED POWDER | |
|---|---|---|---|---|---|---|---|
| | $CeO_2:ZrO_2$ | $Al_2O_3:BaO$, | $Cs_2O$, | $La_2O$ | CALCINATION TEMPERATURE | DIAMETER | SPECIFIC SURFACE AREA |
| EXAMPLES | | | | | | | |
| 21 | 5:1 | 1:3 | — | — | 900° C. | 82Å | 107 m²/g |
| 22 | 5:1 | 1:6 | — | — | 1000° C. | 82Å | 107 m²/g |
| 23 | 5:1 | 1:12 | — | — | 1000° C. | 82Å | 107 m²/g |
| 24 | 3:1 | 1:6 | — | — | 900° C. | 95Å | 102 m²/g |
| 25 | 5:1 | 1:— | 6 | — | 1000° C. | 82Å | 107 m²/g |
| 26 | 5:1 | 1:— | 11 | — | 1000° C. | 82Å | 107 m²/g |
| 27 | 5:1 | 1:— | — | 3 | 1000° C. | 82Å | 107 m²/g |
| 28 | 5:1 | 1:— | — | 6 | 1000° C. | 82Å | 107 m²/g |
| COMPARATIVE EXAMPLES | | | | | | | |
| 7 | — | 1:3 | — | — | 900° C. | — | — |
| 8 | — | 1:6 | — | — | 1000° C. | — | — |
| 9 | — | 1:12 | — | — | 1000° C. | — | — |
| 10 | 5:1 | 1:3 | — | — | 900° C. | — | — |
| 11 | 5:1 | 1:6 | — | — | 1000° C. | — | — |
| 12 | 5:1 | 1:12 | — | — | 1000° C. | — | — |

| | CATALYST SUPPORT POWDER | | | COATING LAYER AFTER THERMAL TREATMENT | |
|---|---|---|---|---|---|
| | SPECIFIC SURFACE AREA | CRYSTAL STRUCTURE | ELUTION OF $NO_x$ STORAGE COMPONENT | SPECIFIC SURFACE AREA | CRYSTAL STRUCTURE |
| EXAMPLES | | | | | |
| 21 | 121 m²/g | AMORPHOUS | 0.1 wt % OR LESS | 112 m²/g | AMORPHOUS |
| 22 | 106 m²/g | AMORPHOUS | 0.1 wt % OR LESS | 105 m²/g | AMORPHOUS |
| 23 | 115 m²/g | AMORPHOUS | 0.1 wt % OR LESS | 108 m²/g | AMORPHOUS |
| 24 | 106 m²/g | AMORPHOUS | 0.1 wt % OR LESS | 104 m²/g | AMORPHOUS |
| 25 | 108 m²/g | AMORPHOUS | 0.1 wt % OR LESS | 107 m²/g | AMORPHOUS |
| 26 | 119 m²/g | AMORPHOUS | 0.1 wt % OR LESS | 112 m²/g | AMORPHOUS |
| 27 | 101 m²/g | AMORPHOUS | 0.1 wt % OR LESS | 103 m²/g | AMORPHOUS |
| 28 | 117 m²/g | AMORPHOUS | 0.1 wt % OR LESS | 111 m²/g | AMORPHOUS |
| COMPARATIVE EXAMPLES | | | | | |
| 7 | — | — | 5.4 wt % | 45 m²/g | $BaAl_2O_4$ |
| 8 | — | — | 3.3 wt % | 63 m²/g | $BaAl_2O_4$ |
| 9 | — | — | 2.4 wt % | 75 m²/g | $BaAl_2O_4$ |
| 10 | — | — | 3.5 wt % | 68 m²/g | $BaAl_2O_4$ |
| 11 | — | — | 2.1 wt % | 69 m²/g | $BaAl_2O_4$ |
| 12 | — | — | 1.3 wt % | 85 m²/g | $BaAl_2O_4$ |

50 parts by weight of catalyst support powder produced in the same way as that of Example 1 and comprising a Cs—Al composite oxide (specific surface area: 68 m²/g, $Cs_2O/Al_2O_3$=1/4) was mixed with 50 parts by weight of the above Pt-loaded powder, and propanol was added to the mixed powder to prepare uniform slurry. Then the slurry was coated on the same honeycomb support formed of cordierite as used in the first series of preferred embodiments. After dried at 120° C. for three hours, the honeycomb support was calcined at 500° C. for one hour to obtain a catalyst. The coating amount of the slurry was 150 g with respect to 1 liter of the honeycomb support.

Further, supernatant liquid of the above slurry was collected and the eluting amount of cesium was determined by chemical analysis. The result is shown in Table 5.

The obtained catalyst was examined about the loading amount of cesium, and conversions of HC and $NO_x$ at two levels, that is, at the initial stage and after a thermal treatment at 800° C. for ten hours. The results are also shown in Table 5.

EXAMPLE 30

A catalyst of Example 30 was prepared in the same way as that of Example 29, except that 70 parts by weight of the catalyst support powder and 30 parts by weight of the Pt-loaded powder were mixed and made into slurry. The eluting amount of cesium and conversions of HC and $NO_x$ were measured in the same way as in Example 29. The results are shown in Table 5.

EXAMPLE 31

A catalyst of Example 31 was prepared in the same way as that of Example 29, except that 90 parts by weight of the catalyst support powder and 10 parts by weight of the Pt-loaded powder were mixed and made into slurry. The eluting amount of cesium and conversions of HC and $NO_x$ were measured in the same way as in Example 29. The results are shown in Table 5.

Comparative Example 13

A predetermined amount of the same catalyst support powder as used in Example 29 was impregnated with a predetermined amount of a platinum dinitrodiammine nitrate aqueous solution having a predetermined concentration. After dried at 120° C., the resulting powder was calcined at 250° C. to obtain catalyst powder. The loading amount of platinum was 1.5% by weight.

A catalyst of Comparative Example 13 was prepared in the same way as that of Example 29, except that slurry was prepared by using this catalyst powder. Further, the eluting amount of cesium and conversions of HC and $NO_x$ were measured in the same way as in Example 29. The results are shown in Table 5.

Comparative Example 14

Pt-loaded powder was prepared in the same way as in Example 29, except that the loading amount of platinum was 1.5% by weight. The Pt-loaded powder was impregnated with a predetermined amount of a cesium acetate aqueous solution having a predetermined concentration. After dried at 120° C., the resulting powder was calcined at 500° C. for one hour, thereby loading cesium. The loading amount of cesium was 0.3 mol with respect to 120 g of alumina.

A catalyst of Comparative Example 14 was prepared in the same way as that of Example 29, except that slurry was prepared by employing the obtained Pt—Cs loaded powder. The eluting amount of cesium and conversions of HC and $NO_x$ were measured in the same way as in Example 29. The results are shown in Table 5.

TABLE 5

| | Cs (WT %) | | | HC CONVERSION | | $NO_x$ CONVERSION | |
|---|---|---|---|---|---|---|---|
| | SUPERNATANT LIQUID | INITIAL | AFTER THERMAL TREATMENT | INITIAL | AFTER THERMAL TREATMENT | INITIAL | AFTER THERMAL TREATMENT |
| EX. 29 | 0.1> | 11.0 | 10.8 | 98 | 99 | 86 | 82 |
| EX. 30 | 0.1> | 15.2 | 14.9 | 96 | 98 | 93 | 81 |
| EX. 31 | 0.1> | 19.4 | 19.0 | 95 | 98 | 94 | 80 |
| COM. EX. 13 | 2.1 | 19.1 | 11.4 | 67 | 71 | 93 | 46 |
| COM. EX. 14 | 3.4 | 24.5 | 8.1 | 63 | 70 | 84 | 34 |

Evaluation

As seen from Table 5, in the catalysts of the examples of the present invention, the eluting amounts of cesium were remarkably small, and the loading amounts of cesium were hardly decreased by the thermal treatments. On the other hand, in the catalysts of the comparative examples, the eluting amounts of cesium were large. Particularly in the catalyst of Comparative Example 14, the thermal treatment brought a sharp decrease in the loading amount of cesium.

The catalysts of the examples of the present invention exhibited high conversions of HC and $NO_x$ both at the initial stage and after the thermal treatments. On the other hand, the catalysts of the comparative examples exhibited low HC conversion at the initial stage and remarkably decreased $NO_x$ conversion after the thermal treatments.

In the comparative examples, it is supposed that when the powder was impregnated with the platinum aqueous solution or made into slurry, cesium was eluted, which caused a decrease in the dispersability of cesium, and accordingly cesium flew away hard at the time of the thermal treatments. Particularly in Comparative Example 14, because the cesium dispersability was particularly low, the flying away of cesium was especially hard, and as a result, the $NO_x$ storage ability after the thermal treatment was largely decreased. Further, in the comparative examples, since platinum was loaded in the vicinity of cesium, the oxidation force of platinum was decreased, and therefore HC conversion was low even at the initial stage.

On the other hand, in the catalysts of the examples of the present invention, because cesium was highly dispersed and not in contact with the platinum aqueous solution, the elution and aggregation of cesium was extremely small, so $NO_x$ conversion was maintained high even after the thermal treatments. Further, since cesium was loaded at some distance from platinum, oxidation force of platinum was prevented from decreasing, which achieved high HC conversion.

Obviously, many modifications and variations of the present invention are possible in the light of the above teachings. It is therefore to be understood that within the scope of the appended claims, the invention may be practiced otherwise than as specifically described.

What is claimed is:

1. A high heat-resistant catalyst, comprising:
   a high heat-resistant catalyst support comprising
      an oxide of at least one metal selected from the group consisting of elements of group IIIb, group IVa and group IVb in the periodic table, and
      an $NO_x$ storage component comprising an oxide of at least one element selected from the group consisting of alkali metals, alkaline-earth metals, and rare-earth elements,
   said oxide and said $NO_x$ storage component constituting an amorphous composite oxide; and
   a porous support loaded with a noble metal wherein said porous support is ceria.

* * * * *